(12) United States Patent
Bennemann et al.

(10) Patent No.: US 12,479,359 B2
(45) Date of Patent: Nov. 25, 2025

(54) METHOD FOR CONTROLLING A LIGHTING DEVICE OF A MOTOR VEHICLE

(71) Applicants: Volkswagen Aktiengesellschaft, Wolfsburg (DE); Audi AG, Ingolstadt (DE)

(72) Inventors: Mark Bennemann, Falkensee (DE); Tobias Moll, Ingolstadt (DE)

(73) Assignees: Volkswagen Aktiengesellschaft, Wolfsburg (DE); AUDI AG, Ingolstadt (DE)

( * ) Notice: Subject to any disclaimer, the term of this patent is extended or adjusted under 35 U.S.C. 154(b) by 92 days.

(21) Appl. No.: 18/700,207

(22) PCT Filed: Oct. 11, 2022

(86) PCT No.: PCT/EP2022/078231
§ 371 (c)(1),
(2) Date: Apr. 10, 2024

(87) PCT Pub. No.: WO2023/062000
PCT Pub. Date: Apr. 20, 2023

(65) Prior Publication Data
US 2024/0399954 A1     Dec. 5, 2024

(30) Foreign Application Priority Data
Oct. 15, 2021 (DE) .......................... 102021126817.6

(51) Int. Cl.
*B60Q 3/85* (2017.01)
*B60K 35/21* (2024.01)
(Continued)

(52) U.S. Cl.
CPC ................ *B60Q 3/85* (2017.02); *B60K 35/21* (2024.01); *B60K 35/22* (2024.01); *B60K 35/25* (2024.01);
(Continued)

(58) Field of Classification Search
CPC .. H04N 13/257; H04N 13/266; H04N 13/261; H04N 21/47205; H04N 13/128;
(Continued)

(56) References Cited

U.S. PATENT DOCUMENTS

2006/0266135 A1* 11/2006 Nishikawa .............. G06T 17/00
73/866.3
2010/0256863 A1* 10/2010 Nielsen ................... G07C 5/085
701/31.4
(Continued)

FOREIGN PATENT DOCUMENTS

DE     102006052777 A1     5/2008
DE     102012214204 A1     2/2014
(Continued)

OTHER PUBLICATIONS

PCT/EP2022/078231. International Preliminary Report on Patentability (Apr. 16, 2024).
PCT/EP2022/078231. International Search Report (Jan. 24, 2023).

*Primary Examiner* — Daniel Previl
(74) *Attorney, Agent, or Firm* — Peter Zura; LOZA & LOZA, LLP (57) ABSTRACT

Technologies and techniques for controlling a lighting device of a motor vehicle, which includes at least one display surface and/or at least one lighting unit. At least one image capable of being provided by a mobile terminal and/or by an external computing device automatically selected; image data describing the at least one selected image is received; and image content information, which describes a color gradient of the at least one selected image, is determined by applying an image content determination criterion to the provided image data. The lighting device is controlled considering the determined image content infor- (Continued)

mation, wherein an appearance generated by means of the lighting device is adapted to the color gradient of the at least one selected image.

20 Claims, 3 Drawing Sheets (51) Int. Cl.
  B60K 35/22    (2024.01)
  B60K 35/25    (2024.01)
  B60K 35/80    (2024.01)
  B60K 35/85    (2024.01)
  B60Q 1/24     (2006.01)
  B60Q 3/78     (2017.01)
(52) U.S. Cl.
  CPC ............ *B60K 35/80* (2024.01); *B60K 35/85* (2024.01); *B60Q 1/247* (2022.05); *B60Q 3/78* (2017.02); *B60K 2360/332* (2024.01); *B60K 2360/349* (2024.01); *B60K 2360/573* (2024.01); *B60K 2360/589* (2024.01); *B60K 2360/592* (2024.01); *B60Q 2900/50* (2022.05)
(58) Field of Classification Search
  CPC ........ H04N 13/15; H04N 13/189; H04N 9/79; H04N 23/81; H04N 23/56; H04N 13/122; H04N 13/156; H04N 13/194; H04N 13/204; H04N 13/239; H04N 13/332; H04N 13/344; H04N 2013/0081; H04N 23/633; H04N 25/61; H04N 21/23412; H04N 21/23418; H04N 21/234318; H04N 21/235; H04N 21/25808; H04N 21/25883; H04N 21/4312; H04N 21/4314; H04N 21/435; H04N 21/44012; H04N 21/4622; H04N 21/47815; H04N 21/4782; H04N 21/812; H04N 21/854; H04N 21/8543; H04N 21/858; H04N 21/8586; H04N 23/11; H04N 23/13; H04N 23/45; H04N 23/55; H04N 23/617; H04N 23/695; H04N 23/741; H04N 23/90; H04N 23/95; H04N 23/951; H04N 7/144; H04N 7/17318; H04N 7/18; H04N 7/183; G11B 27/031; G11B 27/036; G11B 27/34; G11B 27/00; G11B 27/034; G11B 27/105; G06F 16/583; G06F 16/5838; G06F 16/5866; G06F 16/783; G06F 16/7867; G06F 1/163; G06F 18/24; G06F 3/011; G06F 3/0483; G06F 3/04842; G06F 1/1626; G06F 1/1637; G06F 1/1684; G06F 1/1686; G06F 21/6245; G06Q 10/103; G06T 2207/30244; G06T 17/00; G06T 2207/10016; G06T 2207/10032; G06T 7/70; G06T 7/73; G06T 19/20; G06T 2207/10021; G06T 2207/10028; G06T 2207/20024; G06T 2207/20081; G06T 2207/20221; G06T 2207/30184; G06T 2207/30241; G06T 2207/30261; G06T 7/251; G06T 7/55; G06T 7/579; G06T 7/593; G06T 7/62; G06T 7/75; G06T 7/90; G06T 17/205; G06T 2207/10048; G06T 2207/30168; G06T 2207/30204; G06T 2207/30252; G06T 2219/2004; G06T 7/0002; G06T 7/246; G06T 7/248; G06T 1/0007; G06T 2200/24; G06T 2207/20212; G06T 2219/2021; G06T 7/344; B64U 2201/20; B64U 2101/32; B64U 2201/104; B64U 2101/30; G05D 1/0016; G05D 1/0038; G05D 1/0022; G05D 1/0033; G05D 1/0094; G05D 1/101; G05D 1/106; B60K 35/10; B60K 35/29; B60K 35/22; B60K 2360/1526; B60K 2360/167; B60K 2360/186; B60K 2360/188; B60K 2360/334; B60K 35/213; B60K 35/214; B60K 35/23; B60K 35/28; B60K 35/60; B60K 35/81; B60K 37/00; B60K 2360/332; B60K 2360/336; B60K 2360/349; B60K 2360/573; B60K 2360/577; B60K 2360/589; B60K 2360/592; B60K 2360/731; B60K 2360/741; B60K 35/21; B60K 35/25; B60K 35/65; B60K 35/80; B60K 35/85; B60Q 1/1438; B60Q 1/544; B60Q 1/545; B60Q 2300/112; B60Q 2300/23; B60Q 2300/305; B60Q 2300/322; B60Q 2300/324; B60Q 2300/41; B60Q 2300/45; B60Q 2400/50; B60Q 9/00; B60Q 1/247; B60Q 2900/30; B60Q 2900/50; B60Q 3/74; B60Q 3/78; B60Q 3/80; B60Q 3/85; F21S 41/645; F21S 41/657; B60W 60/001; B60W 2050/146; B60W 2420/403; B60W 40/02; B60W 50/14; G01B 11/14; G01B 11/22; G01C 21/3407; G01C 21/3476; G01C 21/3602; G01C 21/3644; G01C 21/3804; G01C 21/3811; G01C 21/3841; G01C 21/3885; G01C 23/00; G01C 21/20; G01C 21/3852; G06V 20/20; G06V 20/582; G06V 20/584; G06V 10/34; G06V 20/56; G06V 20/597; G06V 10/764; G06V 20/50; G06V 20/52; G08G 1/0112; G08G 1/096827; G08G 1/00; G08G 1/0962; G08G 1/16; G08G 1/166; A01B 69/001; B60R 1/002; B60R 1/24; B60R 1/28; B60R 11/02; B60R 2300/305; B62D 15/0295; E02F 9/261; G01S 19/01; G01S 5/16; G03B 15/00; G03B 15/006; G03B 29/00; G03B 42/00; G07C 5/0825; G08B 21/18; G09G 2320/0666; G09G 2380/10; G09G 5/04; G09G 5/37; H04M 1/0264; H04M 1/0266; H04M 1/72403; H04M 2250/52; A61B 2503/06; A61B 5/0004; A61B 5/0022; A61B 5/1451; A61B 5/14532; A61B 5/4839; A61B 5/746; A61M 2205/3592; A61M 2205/505; A61M 2205/80; A61M 2230/201; A61M 5/14; A61M 5/1723; G06N 20/00; G06N 20/20; G06N 3/02; G16H 20/17; G16H 20/60; G16H 40/63; G16H 50/20; G16H 50/70; Y02A 90/10
  USPC ............ 340/461, 463, 468, 457.2, 458, 488, 340/538.15, 555, 691.6, 7.54, 332
  See application file for complete search history.

(56) References Cited

U.S. PATENT DOCUMENTS

2015/0221341 A1\* 8/2015 Akay ................... H04N 9/8205
                                                    386/278
2017/0176338 A1\* 6/2017 Wu ..................... G01N 21/6428

(56) References Cited

U.S. PATENT DOCUMENTS

2017/0330379 A1* 11/2017 Bojanowski ........... B60K 35/10
2020/0031283 A1* 1/2020 Nakasho .................. G08G 1/16

FOREIGN PATENT DOCUMENTS

| DE | 102013004612 A1 | 9/2014 |
| DE | 102017208083 A1 | 11/2017 |
| DE | 102017213994 A1 | 2/2019 |
| DE | 102017128896 A1 | 6/2019 |
| DE | 102018206952 A1 | 11/2019 |
| JP | 4274154 B2 | 6/2009 |

* cited by examiner

METHOD FOR CONTROLLING A LIGHTING DEVICE OF A MOTOR VEHICLE

RELATED APPLICATIONS

The present application claims priority to International Patent Application No. PCT/EP2022/078231 to Bennemann et al., filed Oct. 11, 2022, titled "Method For Controlling A Lighting Device Of A Motor Vehicle," which claims priority to German Pat. App. No. DE 10 2021 126 817.6, filed Oct. 15, 2021, to Bennemann et al., the contents of each being incorporated by reference in their entirety herein.

TECHNICAL FIELD

The present disclosure relates to a technologies and techniques for controlling a lighting device of a motor vehicle, wherein the lighting device comprises at least one display surface and at least one lighting unit. In addition, the present disclosure relates to a motor vehicle with such a lighting device, which is configured to perform such a method.

BACKGROUND

A motor vehicle often comprises at least one lighting device, which can be configured as a display device and/or lighting unit. The lighting device can include at least one display surface, on which information related to the motor vehicle is displayed. Further, the lighting device can comprise at least one lighting unit, such as a lighting bar of light emitting diodes, which is arranged on a vehicle door and/or in an area of a center console of the motor vehicle. Therefore, a vehicle-specific and/or user-specific illumination of an interior of the motor vehicle can be provided by means of the lighting device. Typically, at least one light color, in which an interior of the motor vehicle is illuminated by means of the lighting device, is variably adjustable.

DE 10 2016 222 426 A1 discloses a method for adapting an interior atmosphere of a motor vehicle. Within the scope of the method, occupant information, an environmental situation of the motor vehicle and/or a vehicle status of the motor vehicle are automatically captured and a color is selected based thereon, in which an interior element of the motor vehicle emits light.

DE 10 2012 002 564 A1 discloses an automobile, in the interior of which a lighting means is arranged. The lighting means is controlled depending on various information such as navigation information.

SUMMARY

Aspects of the present disclosure are related to providing a solution, by means of which a lighting device of a motor vehicle can be user-specifically controlled.

Some aspects of the present disclosure are provided in the subject matters of the independent claims, found below. Other aspects are disclosed in the subject matter of the respectively associated dependent claims The present disclosure is based on the realization that a display on a display appliance such as a smart phone or a display device of a motor vehicle, can often be user-specifically adapted only to restricted extent. Because only ready-made display designs, which may allow a variation of a background image, a used font and/or font color, displayed textures and/or a configuration of symbols, can be present for the display on the display appliance. In addition, such a ready-made display design, which can significantly characterize an appearance of the display, is often not adapted at all and if so, only manually adapted by a user of the display appliance in restricted manner, at least in context of the display on the display device in the motor vehicle. For this reason, a preset standard background image and/or writing in a standard font and a standard font color is typically displayed on the display in motor vehicles, which is typically set by a vehicle manufacturer, to increase a recognition factor of the vehicle manufacturer, and therefore is in accordance with a typical design image of the vehicle manufacturer. According to vehicle manufacturer and vehicle model, the appearance can slightly change with respect to a color and/or a font, whenever a driver changes a driving mode of the motor vehicle. However, the appearance by itself herein often remains similar to the standard appearance typical to vehicle manufacturer and an accent color can only be preset, which changes, for example a red font and/or red symbols in a sports mode and a blue font and/or blue symbols in an electrically operated driving mode. However, this appearance of font and symbols is only changed depending on a current vehicle function of the motor vehicle and thus is not user-specific.

In order to allow a user-specific and thus individual design at least of a partial area of an interior illumination and/or an interior display and/or an exterior illumination to a user of the motor vehicle by means of a corresponding control of the display device, user-specific information for controlling the display device should be considered. Since not only one or more displays of the display device, but also at least one lighting unit such as and individual lamp, an illuminated decorative strip and/or at least one indirectly or directly illuminated operating element such as a rotary pressure switch, a button and/or a switch, are often provided in the motor vehicle, the display surface and lighting unit are referred to as a "lighting device" of the motor vehicle. Further, it is the case that user-specific information is often stored in a mobile terminal (e.g., smart phone) of the user, and/or in a user profile of the user, which is recorded on an external computing device. Such user-specific information would be advantageous in order to be able to achieve a personalized control of the lighting device. Further, image data of an environmental capturing device of the motor vehicle, such as an exterior camera of the motor vehicle, can be utilized in the personalized control of the lighting device.

In some examples, a method is disclosed for controlling a lighting device of a motor vehicle. The lighting device includes at least one display surface and/or at least one lighting unit. The lighting unit comprises at least one light emitting diode (LED). Further, a projection of a preset image on a projection surface can be provided in the motor vehicle, wherein this projection is included by the lighting device. The display surface can be included by a display and/or a human-machine interface in the motor vehicle. The lighting device can be arranged in an interior of the motor vehicle. The lighting device arranged in the interior can shine in it as well as optionally illuminate and/or light it.

In some examples, a method may include the steps of examining a communication connection between the motor vehicle and a mobile terminal and/or an external computing device to confirm the connection is established. The mobile terminal may be configured as a mobile phone, smart phone, a tablet and/or a wearable such as a smart watch. The mobile terminal may be arranged in the interior of the motor vehicle. In some examples, the mobile terminal can be arranged outside of the motor vehicle. In this case, a vehicle-specific application can be installed on the mobile terminal, by means of which a data exchange via the communication connection between the motor vehicle and the mobile terminal is possible. Preferably, the mobile terminal is associated with a person associated with the motor vehicle. The external computing device may be configured as a server device, which is arranged outside of the motor vehicle. In this example, user data may be stored on the external computing device. The user data stored in the external computing device may be associated with a user profile. The user profile may be associated with the person associated with the motor vehicle. The person associated with the motor vehicle may be a driver, a further current occupant and/or an owner of the motor vehicle. The driver, occupant and/or owner can alternatively be referred to as user of the motor vehicle.

In some examples, a method for controlling a lighting device of a motor vehicle is disclosed, wherein the method comprises the following steps: capturing clothing data, which describes clothing of an occupant of the motor vehicle, using an interior capturing device of the motor vehicle; determining clothing color information, which describes a clothing color of the clothing, and material structure information, which describes a material structure of the clothing by applying a clothing evaluation criterion to the captured clothing data; and controlling the lighting device considering the determined clothing color information and the determined material structure information, wherein a pattern reproducing the material structure in the clothing color is displayed by means of the lighting device.

In some examples, a motor vehicle with a lighting device is disclosed herein. The motor vehicle is configured to perform the steps of any of the methods described herein. The motor vehicle can be configured as a car, in particular as a passenger car or truck, as a passenger bus or as a motorcycle.

The motor vehicle may include at least two separated areas, namely an area of front seats and an area of backseats. Herein, it can be provided that for the front seats, that is the driver's seat and the passenger seat, in the environment of these seats, a different interior illumination control is implemented than it is the case for the backseats. This may be possible in that a different appearance is selected for display surfaces of the lighting device arranged on a rear side of the driver's seat and/or the passenger seat than for components of the lighting device in the area of the front seats. In some examples, a respective communication connection may be established between multiple mobile terminals and the motor vehicle. Alternatively, or additionally, multiple user profiles can be provided on the external computing device for providing image data.

Further, it is possible that a user-specific adaptation of the appearance is allowed additionally or alternatively to the automatic selection of the image, such that occupants on the backseats can for example manually select an appearance deviating from the occupants in the area of the front seats. For example, this may be implemented by an actuation of one or more corresponding actuation elements in the motor vehicle and/or on the mobile terminal of the respective user.

In addition, the present disclosure relates to a system of a motor vehicle and a mobile terminal and/or an external computing device. The system is configured to perform the steps of the methods described herein.

In addition, the control device for the motor vehicle is contemplated as part of the present disclosure. The control device comprises a processor device, which is configured to perform any of the methods disclosed herein. The processor device can comprise at least one microprocessor and/or at least one microcontroller. The processor device may include a program code, which is configured, upon execution by the processor device, to perform any of the methods disclosed herein. The program code can be stored in a data memory of the processor device.

Developments of the motor vehicle or system according to the present disclosure, which comprise features, as they have already been described in context of the embodiments of the method a, also belong to the present disclosure.

The present disclosure also includes the combination of the features of the described embodiments.

DESCRIPTION OF THE DRAWINGS

In the following, aspects of the present disclosure are described. Hereto, there shows.

DETAILED DESCRIPTION

The embodiments explained in the following are preferred embodiments of the present disclosure. In the embodiments, the described components each represent individual features of the present disclosure to be considered independently of each other, which also each develop the present disclosure independently of each other and thereby are also to be regarded as a constituent of the present disclosure in individual manner or in a combination different from the shown one. Furthermore, the described embodiments can also be supplemented by further ones of the already described features of the present disclosure.

In the figures, functionally identical elements are each provided with the same reference characters.

In some examples disclosed herein, the lighting device may be configured to provide an exterior light configuration of the motor vehicle. For example, the lighting device can include a projection onto a ground and/or an object in an environment of the motor vehicle, which is generated by means of a projection device of the motor vehicle. For example, the projection can be activated after unlocking and/or locking a door latch locking device of the motor vehicle. After its activation, it is for example displayed for a preset period of time of 3 seconds, 5 seconds, 10 seconds, 15 seconds, 20 seconds or 30 seconds. Further, the motor vehicle can comprise a display surface and/or a lighting unit, which radiates into the environment of the motor vehicle, such as for example an exterior display or an exterior lamp, for example on an exterior door handle of a vehicle door of the motor vehicle.

Upon controlling the lighting device, an appearance can be generated. The appearance in the sense of the present disclosure includes a displayed image content, a font, a font color, a symbol, a design element and/or a lighting color, such as for example a color of the light emitted by the lighting unit.

Preferably, the communication connection is a wireless communication connection between a communication interface of the motor vehicle and a communication interface of the mobile terminal or a communication interface of the external computing device. The wireless communication connection can for example be provided via a wireless local area network (WLAN), a Bluetooth connection and/or a mobile data network, for example based on the mobile radio standard Long Term Evolution (LTE), Long Term Evolution Advanced (LTE-A), Fifth Generation (5G) or Sixth Generation (6G).

If the communication connection between the motor vehicle and the mobile terminal is established, an automatic selection of at least one image capable of being provided by the mobile terminal is implemented by applying a selection criterion to image data capable of being provided by the mobile terminal. Alternatively, or additionally thereto, if the communication connection between the motor vehicle and the external computing device is established and in particular user data is stored in the external computing device, which is associated with the user profile of the person associated with the motor vehicle, a selection of at least one image capable of being provided by the external computing device is automatically performed. The automatic selection of the at least one image capable of being provided by the external computing device may be implemented by applying the selection criterion to image data included by the user data.

In some examples, if the image data describes a static and/or moved image, this means that it is associated with a photo or a video. In some examples, it can be provided that in applying the selection criterion, only a lastly added image or at least one image of all of the images, which have been added in a preceding period of time, is selected. Here, a photo, video and/or different image stored on the mobile terminal or for example transferred to the external computing device is understood as the added image. Thus, the lastly added image is for example a photo lastly taken by a camera of the mobile terminal. It can be stored on the mobile terminal itself or externally stored. The preset period of time is for example the last three days, a last week, two last weeks, a last month, a last half year or a last year starting from the current day. Alternatively, the period of time can be any period of time between the mentioned periods of time, that is for example be between one day and one year, two days and a half year, three days and one month, five days and two weeks or seven days and ten days. The images, which have been added in the preset period of time, can for example be a series of multiple photos, which are for example stored on the mobile terminal in the form of an automatically generated retrospection. Preferably, not only one image is automatically selected, but a plurality of images, such as for example an image series including 5, 10, 20, 30, 50 or 100 images, for example based on the generated retrospection or a preferably manually or automatically created photo album.

Alternatively, or additionally thereto, the image data can be associated with an Internet page lastly visited by a user of the mobile terminal, that is for example be recorded on it. If the Internet page is for example an Internet representation of a tourist information and/or a booking platform for hotels and/or holiday apartments, the image data associated with the last visited Internet page can for example be photos of a travel destination. Alternatively, or additionally to the lastly visited Internet page as the source of the image data, image data of Internet pages visited in a preset time interval can be taken into account. The time interval for example includes one week, two weeks or one month. Finally, at least one image is present in the form of the image data.

In some examples, the image data can be provided by the mobile terminal, that is, the image data can be stored in the mobile terminal itself. Alternatively, or additionally thereto, it can be stored in the external computing device. The external computing device can be a cloud, to which the image data has been provided. The image data describing the selected image can be transferred from the external computing device for example via the communication connection to the mobile terminal and be communicated from it for example to the motor vehicle. In case of the communication connection between the motor vehicle and the mobile terminal, it is thus not a requirement that the image data is actually stored on the mobile terminal itself at the current point of time, but it can be recorded in the external computing device as a storage device for the mobile terminal if it is not transferable via the mobile terminal to the motor vehicle at the current point of time, that is can basically be provided by the mobile terminal.

In a further method step, the image data describing the at least one selected image can be received. Thus, the image data is provided. The motor vehicle receives the image data, which is communicated from the mobile terminal and/or the external computing device to the motor vehicle, since it is provided by the mobile terminal or the external computing device. Hereto, the image data may be communicated to the motor vehicle via the communication connection. In the motor vehicle, a control device is preferably provided, which is configured to perform the automatic selection of the at least one image, of which the image data is provided, that is received.

In a further method step, determining image content information may be implemented, preferably using the control device. The image content information may be configured to describe a color gradient of the at least one selected image. In other words, the image content information may describe a color gradient in the at least one selected image. Herein, the color gradient is a local color gradient, that is a change of colors observed for example across an overall surface or at least a partial surface of the image. Thus, the image content information comprises color gradient information, from which the color gradient in the selected image can be taken. The image content information is determined by application of an image content determination criterion to the provided image data.

Both the selection criterion and the image content determination criterion may each be configured as a rule and/or an algorithm, based on which the automatic selection of the at least one image or determining the image content information is implemented. The selection criterion as well as the image content determination criterion are preferably stored in the control device.

In some examples, a combination of the individual images may be implemented in applying the image content determination criterion to multiple selected images, that is to the image data, which describes multiple images. Alternatively, or additionally thereto, an image issue, which the multiple images have in common, can be recognized based on the multiple images. For example, based on the photos of the user of the motor vehicle captured within a configured period of time (e.g., the last two weeks), numerous photos of which show a mountain landscape or mountainous landscape, the common image issue "mountain landscape" or "mountainous landscape" can be recognized. Based on this image issue, image content information, which describes an artificial image of the recognized image issue, can for example be generated by applying an artificial neural network. Thus, by applying methods of artificial intelligence, an artificial mountain landscape can be generated in this example, which has a color gradient typical to a mountain landscape. The information that the user is for example interested in or at least likes a mountain landscape, is herein generated based on the preferably automatically selected at least one image capable of being provided such that although a photo actually taken by himself is not taken into account, a typical range of interest of the user can nevertheless be taken up and be selected as an inspiration for example for a generated appearance.

In a further method step, controlling the lighting device considering the determined image content information is implemented. An appearance generated by means of the lighting device is adapted to the color gradient of the at least one selected image. The control of the lighting device is preferably implemented by means of the control device.

For example, if a smart phone is connected to the motor vehicle, since a user of the smart phone for example enters the motor vehicle as a driver, the communication connection can for example be automatically established. Holiday photos of the user from the past weeks are stored on the mobile terminal for example in a storage unit of the mobile terminal. These holiday photos for example have been captured in a walking holiday in the Alps ten days ago and show numerous representations of mountain landscapes. By applying the selection criterion, at least one of the landscape photos can now be automatically selected from the holiday photos and be provided to the motor vehicle as the corresponding image data. Thereupon, the control device determines the typical color gradient of a mountain landscape by applying the image content determination criterion, which for example includes a blue sky with clouds in an upper image area, grey mountains in a central image area and a forested and thus green zone in a lower image area. This color gradient is thereupon provided in the form of the determined image content information for controlling the lighting device such that is for example represents three zones differently configured in color on the display surface in the interior of the motor vehicle in the corresponding typical colors. In a vertical direction of the display surface, thus, a for example light blue color tint is selected in an upper area for font and/or symbols displayed there, a grey color tint in the central image area adjoining thereto and for example a dark green color tint in the lower image area. In addition, a side illumination shining grey can for example be selected in the motor vehicle if corresponding lighting units are for example installed in doors of the motor vehicle. In addition, the font can for example be adapted and an ornate or rustically looking font may be selected.

Accordingly, a personalized user-specific control of the lighting device of the motor vehicle may be achieved. Because the appearance in the motor vehicle generated by means of the lighting device may be adapted to user-specific information, which is here present in the form of the provided image data of the selected at least one image, at least with respect to a color gradient. This results in the fact that a high degree of individualization with respect to the light design of the interior and/or of the exterior area of the motor vehicle may be achieved. Hereby, it can be contributed to a sense of well-being of the user and further occupants of the motor vehicle, in particular since current holiday photos are used for inspiration for the generated appearance. Moreover, such a control of the lighting device offers a high recognition factor such that, if the described control may be used in a borrowed vehicle, for example a fleet vehicle or a car sharing vehicle, the user can immediately feel well and familiar in it despite of the motor vehicle actually foreign to him.

In some examples, the image content information may comprise structure information. The structure information describes a surface structure of an object represented in at least one image. For example, if the mountain landscape is represented on the image, a surface structure of the mountains represented in the image may be a rough, rocky surface. A pattern reproducing the surface structure is displayed on a display surface of the lighting device. Thus, a typical rock configuration is optically displayed as the pattern. If the object in the selected image is a tree, a pattern symbolizing leaves can be displayed. The surface structure can be a texture or a typical texture of the object represented on the image. Preferably, it is at least distinguished between a smooth and a matte and thus rough surface structure as the surface structure. For example, if the mountain landscape is represented on the image, alternatively to the previously described tricolored configuration in light blue, grey and dark green, only a grey appearance can now be selected, but which imitates the rough surface of the mountains in its local color variations, such that a matte grey configuration varying in its grey tints is finally displayed by means of the lighting device, for example on the display surface. This results in a particularly pictorial representation of the holiday memories and thus increases the user-specific sense of well-being due to the holiday associations allowed hereby.

In some examples, the display surface may include a tactile surface. Preferably, the display surface is configured as a touch-sensitive surface, upon touch of which and thus preferably upon actuation of which a differently haptically perceived surface is generated. Such a display surface is typically based on electric adhesion and allows generating different haptic effects during a touch movement. With such a display surface, it can be locally distinguished between smooth and rough surface parts. Now, the display surface outputs haptic feedback reproducing the surface structure considering the structure information upon actuation by the occupant of the motor vehicle. In case of the selected holiday photo with the mountain landscape, the rough surface of the mountains can be generated as haptic feedback in actuating the touch-sensitive display surface with the tactile surface. As soon as the user sweeps over the touch-sensitive display surface with a finger for actuating it, he is haptically reminded of his holiday at the finger such that the control of the lighting device overall is configured particularly user-specifically and thus according to the preferences of the user.

In some examples, a landscape depicted in the at least one image is recognized in applying the image content determination criterion. The determined image content information now describes the color gradient and/or the surface structure of the recognized landscape. In order that this is possible, the image content determination criterion includes an algorithm, based on which a representation of a person in the image can be recognized and an image part showing the person can be classified as not belonging to the landscape. Finally, by applying methods of the digital image processing, the landscape depicted in the image can be recognized and preferably be isolated from further image contents. Herein, nature captures are preferably understood as landscape, for example as an environment of persons shown on the image or as pure landscape photograph. A landscape may be a forest, a garden, a park, a meadow, a mountain landscape, a desert landscape, a beach, a body of water, a lakeshore and/or a different nature representation.

The structure information, which describes the surface structure of the recognized landscape, may be determined by applying a landscape evaluation criterion, wherein the landscape evaluation criterion is included by the image content determination criterion. The illumination generated by means of the lighting device, that is the generated appearance, can then display a color gradient reproducing the surface structure of the recognized landscape. Thus, a pattern may be displayed, which reproduces the surface structure of the landscape. Hereby, it is advantageously avoided that only a skin color of persons, who are represented on the selected image, is selected as the dominant color for the generated appearance, but it is achieved that rather landscape-related color gradients are selected as characterizing the appearance. Hereby, the described user specification is achieved, since not only color gradients generally typical to humans are generated, which are thereby relatively impersonal, but preferred environments and landscapes are placed in the foreground, which are inherently neutral, but nevertheless can have a calming effect as well as a stimulating effect on the user since they have a relation to at least one holiday photo of the user or reproduce the holiday photo.

In some examples, location information associated with the provided image data may also be provided. For example, the location information may be a location coordinate. Alternatively, the location information can designate a location in the form of a name of an area, a town, a village, a region or a country. The provided location information is taken into account in applying the image content determination criterion. The determined image content information describes a color gradient associated with the provided location information and/or a surface structure associated with the provided location information. Thus, a location-typical color gradient and/or a location-typical surface structure are determined and provided by means of the image content information. If a skiing location in the Alps is present as the location information to the image data, the determined image content information can describe a winter landscape typical to the known location. Herein, date information to the image data can alternatively or additionally be considered, which is indicative of a season like winter. Alternatively, or additionally thereto, the season can be determined based on the image data itself, for example by recognizing a white landscape between or around one or more represented persons in the at least one image, such that the season winter can be inferred. Alternatively, or additionally, a season-specific vegetation element can be automatically generated and displayed based on the season, such as an apple tree with blossoms in image data, which has been captured in spring, or a tree with autumnally colored leaves in image data, which has been captured in autumn.

Thereupon, the lighting device is preferably kept in a wintery appearance representing a skiing location, that may be represented in white tints with snow crystal representations. Here, the location-typical color gradient and/or the location-typical surface structure is thus selected for the generated appearance already based on the location information to the image data. The location-typical surface structure may be a smooth surface in this example, which symbolizes a smooth snow surface. Whenever the selected image contains numerous details such as represented persons or interior representations, a more general appearance reminding of the location of the image data can nevertheless be generated based on the location information.

In this context, the determined image content information may describe the color gradient associated with the provided location information and/or the surface structure associated with the provided location information only if a landscape is not recognized in the at least one image upon applying the image content determination criterion. Thus, it can always be resorted to the location information if actual landscape information cannot be taken from the selected image. For example, this is the case with pure interior captures or optionally with images with numerous persons. Thus, it is always prevented that appearances not uniquely classifiable and therefore not inducing an association with a past holiday at the user of the motor vehicle are selected, but a reasonable control of the lighting device is always implemented.

In some examples, the determined image content information may be stored in the mobile terminal and/or in the user profile. The automatically generated appearance can thus be stored for future uses. In this context, it can further be provided that particularities are automatically detected in the at least one selected image, with respect to a color palette, an occurrence, a gradient, a structure, a pattern, a sequence, a size ratio, within the background. These particularities can be used to display the generated appearance considering the image content information.

Further, an option can be provided to the user, to vary the determined image content information by means of corresponding actuation of an actuation element within the motor vehicle, such that an appearance particularly convincing for him can be generated. Thereupon, it can be user-specifically adapted by user-specific definitions, for example a font, a color of symbols and/or a background, and thereupon be stored with or without these adaptations in the control device.

Alternatively, or additionally thereto, the determined image content information can be recorded, that is stored, for example, on the mobile terminal and/or in the external computing device. If this is the case, the already stored determined image content information can be again loaded in a different motor vehicle, which establishes the communication connection to the mobile terminal and/or the external computing device. Thus, it can always be resorted to the previously determined image content information in multiple vehicles, which are used by the user. Herein, the user can select features to be adopted and/or restrict a number of adopted elements such that only three of five recognized colors are adopted. Further, the user can allocate individual features in that the user can select a recognized surface structure as the background and/or a certain color as a color accent for font and/or symbols. Finally, the user can influence all of the display contents and partial aspects as well as lamps and the color gradient thereof, that is finally characterize and newly define the generated appearance.

By storing the determined image content information, the perception may be seen as particularly aesthetic at any time such that it can be used independently of motor vehicle. Further, it can be provided that the thus-stored image content information can be applied not only for the lighting device of a motor vehicle, but can be used for an appearance of the mobile terminal and/or an electrical appliance, which is associated with the user, such as a private television set. If the user does not desire image content information repeatedly newly created and generated, the user can store and provide an appearance particularly well pleasing him for future applications. This results in a particularly comfortable user specification.

In some examples, at least one of the following data or information may be considered when controlling the lighting device: Environmental information, position information, environmental temperature information, time information, driving mode information, driving route information and/or state information. The environmental information describes an environment of the motor vehicle captured by means of an environmental capturing device of the motor vehicle. Thus, the environmental information describes a current environmental landscape of the motor vehicle. Herein, the environment may be captured by means of the environmental capturing device, which includes a front camera, side cameras and/or a rear camera. Hereby, the appearance can be adapted to the current environment of the motor vehicle.

Position information may show a position of the motor vehicle and may be determined by means of a position determination device of the motor vehicle such as a navigation system. The position information is a coordinate. Thereupon, location information associated with the coordinate, that is the position information, can be determined and the location-typical color gradient and/or the location-typical surface structure can be described by the determined image content information.

Environmental temperature information is preferably determined via a temperature sensor in the motor vehicle and describes a temperature in the environment of the motor vehicle. For example, it can be distinguished between a warm and a cold environment, wherein warm color tints like red and/or yellow tints are selected in the motor vehicle for controlling the lighting device in the cold environment at low temperatures, whereas cooler colors like blue tints can be selected at warmer temperatures. Hereby, it can be contributed to a felt tempering within the motor vehicle.

Time information describes a current point of time such that it can be distinguished between a bright and dark vehicle environment. Thus, the time information differentiates at least between day and night. Hereby, an adaptation to a biorhythm of the user can be achieved. For example, the color gradient of the mountain landscape can be implemented in darker color tints if it is currently night, than it would be the case during a travel with the motor vehicle effected during the day.

Driving mode information describes a driving mode activated in the motor vehicle and may allow a different coloring and/or surface structure at different driving modes. Driving modes are a sports mode, an environmentally friendly driving mode, an electrically driven driving mode and/or a comfort mode.

Driving route information describes a driving route of the motor vehicle and may distinguish between a short or long driving distance and/or a selected road type. Thus, it can be distinguished if the motor vehicle is currently on a route in a midtown, on a rural road or on an expressway. For example, information on a typical stress level and/or a degree of fatigue of the user of the motor vehicle can be gained therefrom, such that calming or activating color tints can be selected for the appearance. In case of a particularly long driving route, in which a driving time of multiple hours has to be expected, stimulating colors can be selected, whereas such a motivation of the driver based on a color design of the appearance can be abandoned in case of a short drive.

State information may describe a state of an occupant of the motor vehicle and is captured by means of an interior capturing device of the motor vehicle such as an interior camera. By means of the interior capturing device, an eyelid movement of a driver of the motor vehicle can be monitored. Alternatively, or additionally thereto, the state information can be determined by means of a wearable, such as a smart watch or a fitness wristband. The state information includes information to a heart rate, breathing, head movement and/or eye movement of the driver of the motor vehicle. If it is recognized based on the state information that the driver is currently tired or at least fatigued, it can be counteracted the fatigue by means of a more intense emphasis of the surface structure, that is a more intense representation of the pattern imitating the surface structure. At a high degree of attention, it can be changed to subtle colors and the representation of no surface structure to not distract the driver.

Thus, it can be achieved that an optimum control of the lighting device is selected considering numerous further data since an optimum appearance can be determined, which can be adapted to a color gradient of the at least one selected image, but nevertheless can consider numerous or an individual one of the information sources described herein. This not only contributes to the user-specific control of the lighting device, but also to a control depending on situation and environment.

In some examples, if the communication connection is not established and/or an image capable of being provided is not selectable, the following steps may be performed: Capturing clothing data describing clothing of an occupant of the motor vehicle is implemented. This is implemented by means of the interior capturing device of the motor vehicle such as the interior camera of the motor vehicle. If a driver of the motor vehicle wears a red wool pullover, the red wool pullover is captured in the form of image data, in particular including optionally present color shades, and described by means of the clothing data in this method step.

Thereupon, clothing color information is determined, which describes a clothing color of the clothing. Additionally, or optionally alternatively, material structure information is captured, which describes a material structure of the clothing. Determining the clothing color information is implemented by applying a clothing evaluation criterion to the captured clothing data. Determining the material structure information is implemented by applying the clothing evaluation criterion to the captured clothing data. Thus, in this example, the material structure of wool is captured in addition to the red color, which has a knitting structure typical to this pullover. Finally, the local and detailed color gradient of the clothing of the driver as the occupant of the motor vehicle is thus determined.

Thereupon, controlling the lighting device considering the determined clothing color information and the determined material structure information is implemented. Using the lighting device, a pattern reproducing the material structure in the clothing color is displayed. Thus, an appearance is finally selected, which reproduces and thus represents the clothing of the occupant in color and pattern. Hereby, a particularly intense personification is achieved, since the appearance, which is generated by means of the lighting device, finally adapts to the current clothing of the driver of the motor vehicle. Herein, it is the idea that the driver immediately recognizes in this case that the lighting device adapts to his clothing, whereby he can feel particularly well and preserved in the motor vehicle. Herein, it is to be emphasized that not only the clothing color, that is the color of the clothing, is captured and finally mirrored by the motor vehicle, but also the actual texture of the clothing in the form of the material structure information is captured and considered. This results in an all-round experience for the user of the motor vehicle.

Figure 1:
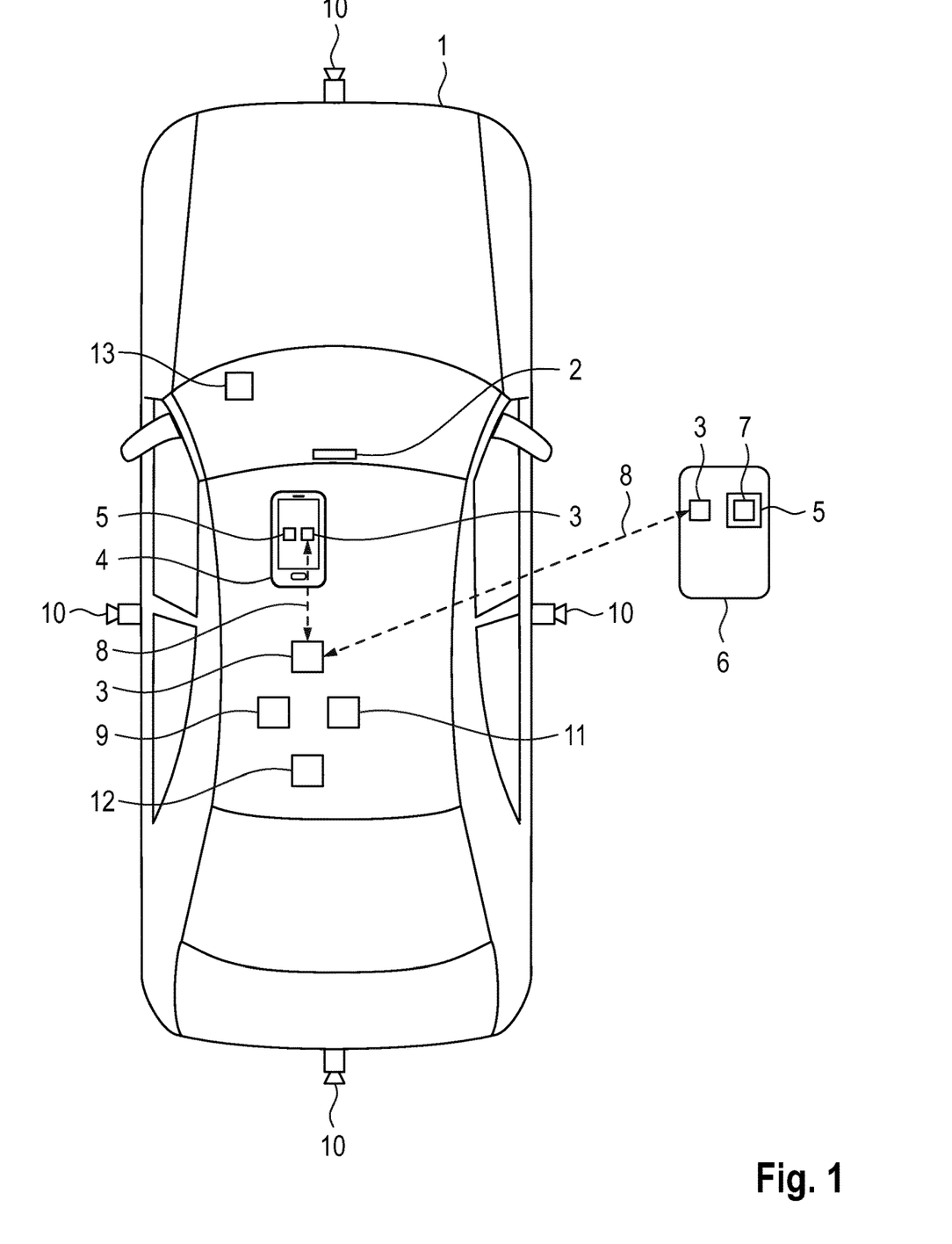
FIG. 1 illustrates a schematic representation of a motor vehicle with a lighting device, according to some aspects of the present disclosure.

Turning to FIG. 1, the drawing illustrates a motor vehicle 1. The motor vehicle 1 comprises a lighting device 2. In addition, the motor vehicle 1 comprises a communication interface 3. A mobile terminal 4 is arranged in the motor vehicle 1. The mobile terminal 4 is positioned in an interior of the motor vehicle 1, for example in a retaining device provided thereto. Alternatively, or additionally thereto, the mobile terminal 4 can be arranged outside of the motor vehicle 1. Preferably, the mobile terminal 4 is associated with a user of the motor vehicle 1, for example with a driver or another occupant of the motor vehicle 1. The mobile terminal 4 comprises a storage unit 5. For example, photos and/or video recordings of the user of the motor vehicle 1 are stored in the storage unit 5.

In FIG. 1, an external computing device 6 is further disclosed. The external computing device 6 also includes the communication interface 3 as well as the storage unit 5. For example, user data 7 is stored in the storage unit 5. The user data 7 is associated with a user profile of a person, who is associated with the motor vehicle 1. The person is for example the driver and/or the further occupant of the motor vehicle 1, thus for example the user of the motor vehicle 1.

A communication connection 8 can be established between the communication interface 3 of the mobile terminal 4 and the communication interface 3 of the motor vehicle 1. Alternatively, or additionally thereto, the communication connection 8 can be established between the communication interface 3 of the external computing device 6 and the communication interface 3 of the motor vehicle 1. Preferably, the communication connection 8 is a wireless connection. The wireless communication connection 8 can for example be provided via a wireless local area network (WLAN), a Bluetooth connection and/or a mobile data network, for example based on the mobile radio standard Long Term Evolution (LTE), Long Term Evolution Advanced (LTE-A), Fifth Generation (5G) or Sixth Generation (6G).

The motor vehicle 1 includes a control device 9. Furthermore, the motor vehicle 1 includes an environmental capturing device 10. The environmental capturing device 10 is configured to capture an environment of the motor vehicle 1 and to provide data describing the environment. In the example outlined here, the environmental capturing device 10 includes a front camera, a rear camera as well as two side cameras. For example, the side cameras can be arranged in side mirrors of the motor vehicle 1 (not outlined here).

The motor vehicle 1 comprises a position determination device 11, a temperature sensor 12 as well as an interior capturing device 13. The interior capturing device 13 may be configured as an interior camera of the motor vehicle 1, by means of which the driver of the motor vehicle 1 can for example be captured and monitored during a drive with the motor vehicle 1.

Figure 2:
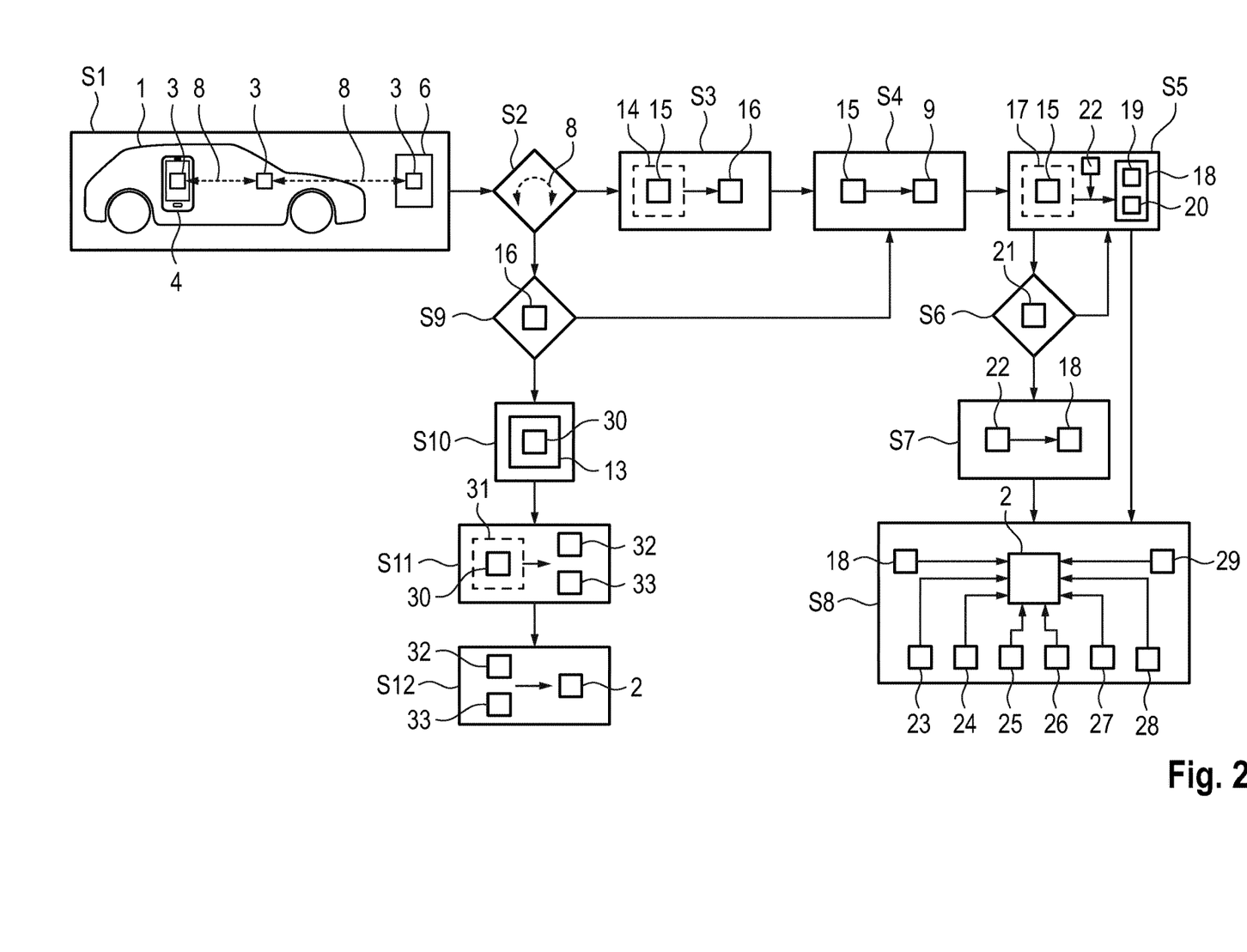
FIG. 2 illustrates a schematic representation, and a signal flow graph of a method for controlling a lighting device of a motor vehicle, according to some aspects of the present disclosure.

In FIG. 2, a method for controlling the lighting device 2 of the motor vehicle 1 is disclosed. Herein, the communication connection 8 between the mobile terminal 4 arranged in the interior of the motor vehicle 1 in this example and the motor vehicle 1 is established in a method step S1. Alternatively, or additionally thereto, the communication connection 8 between the external computing device 6 and the motor vehicle 1 is established.

In a method step S2, it is examined if the communication connection 8 between the motor vehicle 1 and the mobile terminal 4 and/or the motor vehicle 1 and the external computing device 6 is established. If this is the case, an automatic selection of at least one image 16 capable of being provided by the mobile terminal 4 and/or an automatic selection of at least one image 16 capable of being provided by the external computing device 6 is implemented in a method step S3. Hereto, a selection criterion 14 may be applied to image data 15 capable of being provided by the mobile terminal 4 or to image data 15 capable of being provided by the external computing device 6, which is included by the user data 7. The selection criterion 14 may be applied either to individual or multiple image data 15, which is for example included by a retrospection of multiple photos captured in a preset period of time. Preferably, a photo captured via a camera of the mobile terminal 4 is selected. Alternatively, or additionally thereto, the image data 15 can represent a video and/or a representation on a for example lastly visited by the person associated with the mobile terminal 4 and/or the user profile.

In a method step S4, the image data 15 describing the at least one selected image 16 can be provided, namely, it is provided to the control device 9. Hereto, the motor vehicle 1 receives the image data 15. The method steps S1 to S3 can be performed by the control device 9 of the motor vehicle 1, at least on the vehicle side.

In a method step S5, application of an image content determination criterion 17 to the provided image data 15 is implemented. Hereby, image content information 18 is determined, which describes a color gradient of the at least one selected image 16. This color gradient can for example be described by color gradient information 19. Further, structure information 20 can be determined, which describes a surface structure of an object represented in the at least one image 16.

In applying the image content determination criterion 17, a method step S6 can further be implemented, within the scope of which it is examined if a landscape 21 is depicted in the at least one image 16, which is recognized. If the landscape 21 is recognized in the at least one image 16 in applying the image content determination criterion 17, it can be considered in applying the image content determination criterion 17, wherein the determined image content information 18 describes the color gradient and/or the surface structure of the recognized landscape 21. Here, this is exemplarily outlined for the method step S5.

If a landscape 21 is not recognized in the at least one image 16 in applying the image content determination criterion 17, provided location information 22 is considered and implemented in determining the image content information 18 in a method step S7. Independently thereof, the location information 22 can be considered in the method step S5, namely in applying the image content determination criterion 17 (not outlined here). The image content information 18 determined in method step S7 describes a color gradient associated with the provided location information 22 and/or a surface structure associated with the provided location information 22.

Subsequent to method step S7 or directly to method step S5, controlling the lighting device 2 considering the determined image content information 18 is implemented in a method step S8. Herein, an appearance generated by means of the lighting device 2 is adapted to the color gradient of the at least one selected image 16, that is, at least the color gradient information 19 is considered by the appearance. Further, it is possible that further information is considered when controlling the lighting device 2, namely environmental information 23, which is captured by means of the environmental capturing device 10 of the motor vehicle 1 and describes the environment of the motor vehicle 1, position information 24, which describes a position of the motor vehicle 1 and is determined by means of the position determination device 11, environmental temperature information 25, which describes a temperature of the environment of the motor vehicle 1 and is determined by means of the temperature sensor 12, time information 26, which describes a current point of time, which is for example determined by means of a clock of the motor vehicle 1, driving mode information 27, which describes a driving mode activated in the motor vehicle 1, driving route information 28, which describes a driving route of the motor vehicle 1 and is for example recorded in a navigation system of the motor vehicle 1, and/or state information 29. The state information 29 describes a state of the occupant of the motor vehicle 1 and is determined by means of the interior capturing device 13 and/or for example a wearable as a mobile terminal 4 such as for example a smart watch. The state information 29 for example includes a heart rate, information to the breathing and/or head movement, but also or alternatively to the eye movement of the driver and/or another occupant. The driving route information 28 includes the information if the current drive is a short or long distance and/or information about a road type of a road, on which the motor vehicle 1 drives.

In the method step S8, a pattern reproducing the surface structure can additionally be displayed for example on a display surface 34 (see reference character 34 in FIG. 3) of the lighting device 2 based on the structure information 20.

If it is determined in method step S2 that the communication connection 8 is not established, it can be examined in a method step S9 if an image 16 capable of being provided is selectable, that is if image data 15, which describes the selected image 16, is provided. If this is the case despite of non-established communication connection 8, it can nevertheless be proceeded for example to method step S4 in that an image 16, which is for example already recorded in the motor vehicle 1 or is specifically communicated from the mobile terminal 4 or the external computing device 6 to the motor vehicle 1, is for example manually selected. Herein, it can be provided that an image 16 can be provided for example by means of a voice input of the user of the motor vehicle 1, who for example designates an image issue such as for example the image issue "mountain landscape", despite of lacking communication connection 8, since it is for example already stored in the motor vehicle 1 under the image issue "mountain landscape". In this case, the method steps S4 to S8 can nevertheless be performed.

If an image 16 capable of being provided is not selectable in method step S9, capturing clothing data 30 is for example performed in a method step S10. It is captured by means of the interior capturing device 13 of the motor vehicle 1. The clothing data 30 for example describe a spatial clothing color gradient of clothing of the occupant of the motor vehicle 1. Additionally, or alternatively, the clothing data 30 can describe a material of the clothing and/or a weaving pattern of the clothing. For example, it can be determined that the driver of the motor vehicle 1 wears a red knit pullover. In a method step S11, a clothing evaluation criterion 31 can thereupon be applied to the captured clothing data 30. Herein, clothing color information 32 is determined, which describes a clothing color of the clothing of the occupant. In addition, material structure information 33 is determined, which describes a material structure of the clothing of the occupant.

In a method step S12, control of the lighting device 2 considering the determined clothing color information 32 and the determined material structure information 33 is for example implemented. By means of the lighting device 2, a pattern reproducing the material structure in the clothing color is displayed, for example on the display surface 34. Finally, the generated appearance is adapted to the material structure as well as the clothing color of the clothing. Thereupon, the lighting device 2 is for example kept in a red tint, wherein a typical knitting wool pattern is optically represented as the surface structure.

Figure 3:
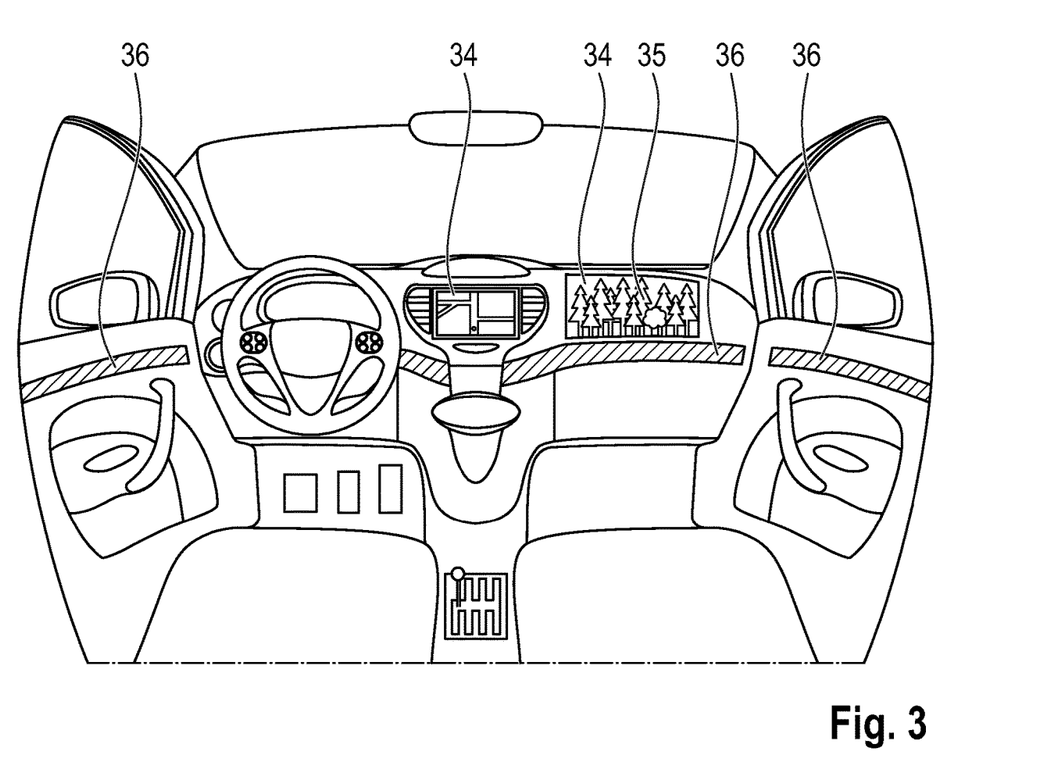
FIG. 3 illustrates a schematic representation of an interior of a motor vehicle with the lighting device, according to some aspects of the present disclosure.

In FIG. 3, the lighting device 2 in the interior of the motor vehicle 1 is outlined. Here, it includes two display surfaces 34. At least one of the display surfaces 34 preferably comprises a tactile surface 35. Both display surfaces 34 are preferably configured as touch-sensitive display surfaces 34, that is as touch displays. The tactile surface 35 can be controlled such that haptic feedback reproducing the surface structure of the image 16 is output considering the structure information 20 upon actuation by the occupant of the motor vehicle 1. In this example, a photo with a forest landscape has been automatically selected by the mobile terminal 4 in the method step S3. It has been provided in the method step S4. Thereupon, the image content information 18 is determined in the method step S5, which represents the color gradient of such a forest photograph. Thereupon, the lighting device 2 is controlled such that the appearance thereof is adapted at least to a color gradient of a forest, but also reflects the structure information 20, that is the typical surface structure of a forest, in the method step S8. Here, a color selection of a map, which is displayed on the centrally arranged display surface 34, is for example kept in green tints of the forest landscape. The forest landscape is symbolically represented on the display surface 34 arranged laterally thereto with the tactile surface 35. In case of touching this tactile surface 35, a sequence of smooth structures with edges is represented, which symbolizes the leafage of the represented trees. If, as exemplarily illustrated here, a coniferous forest dominates the determined image content information 18, a pointed structure can for example be generated by means of the tactile surface 35, which symbolizes the haptic feeling of tree needles.

The lighting device 2 shown here comprises multiple lighting units 36, which are arranged below the two display surfaces 34 as well as laterally in the area of doors of the motor vehicle 1. They are for example illuminated in a dark green color tint, which corresponds to the color gradient of the forest represented on the selected image 16.

The lighting unit 36 preferably comprises numerous individual light-emitting diodes (LED), which can be controlled in individual manner and differentiated manner with respect to a color tint.

Alternatively, or additionally thereto, the lighting device 2 can comprise a display surface 34 and/or a lighting unit 36, which is arranged on an exterior area of the motor vehicle 1. In this case, a projection into the environment of the motor vehicle 1 can be implemented and/or an exterior display and/or an exterior illumination can be provided for example by means of the lighting device 2.

Overall, the examples show an adaptive color scheme for the lighting device 2 of a motor vehicle 1. Herein, the lighting device 2 is to be able to individually and optionally also dynamically adapt to the user and/or the environment thereof. The adaptation can be actively and thus deliberately initiated by the user. Preferably, it is fully automatically implemented in the background by means of corresponding control of the control device 9.

The active or automatic adaptation can be initiated via the mobile terminal 4 in the motor vehicle 1. For example, a specific capture of the image 16 to be selected can be implemented, for example by means of the environmental capturing device 10 and/or the camera of the mobile terminal 4. Alternatively, or additionally thereto, it can be provided that corresponding contents are already brought along, that is are already stored on the mobile terminal 4 and/or in the external computing device 6 in the corresponding user profile. The automatic selection can for example be applied to at least one photo, a video and/or an Internet page content or content of an Internet address. Herein, searched features are extracted, like occurring colors, namely generally colors or dominant colors, a brightness, a contrast, a structure or a pattern and/or a modulation of frequency in case of a video as the image data 15. In case of an Internet page, the lighting device 2 can be directly adapted to the content or appearance and automatically follow dynamic changes by itself.

The selection of the at least one image 16 capable of being provided and the subsequent adoption thereof for controlling the lighting device 2 is implemented by the user and/or by automatic weighting. The automatic adoption is in particular interesting in shared vehicles such as for example within the scope of car sharing.

The selection of the at least one image 16 capable of being provided is autonomously implemented by the control device 9 without explicit initiation by the user. This can for example occur in the motor vehicle 1 by the capture of the occupant. Based on clothing, jewelry, a hairstyle and so on, patterns and structures, color palettes and/or individual accent colors can be recognized and be considered for the generated appearance in the form of the determined image content information 18. Finally, the appearance can correspondingly reproduce them. Finally, the appearance, whether on a screen, thus the display surface 34, or by means of the lighting unit 36, individually and dynamically adapts to the user, or the user himself selects the desired appearance. Especially in vehicle fleets and car sharing vehicles, therefore, a certain recognition factor can also be generated.

Finally, different systems such as for example a private television set, the mobile terminal 4, such as for example a smart phone, a tablet or another system, are adapted to the appearance of the motor vehicle 1. This can be user-specifically or place-related implemented. Herein, relevant devices within the motor vehicle 1 are optical sensors, preferably camera sensors, that is the environmental capturing device 10 of the motor vehicle 1. Thus, optical sensors directly integrated in the lighting device 2 or the mobile terminal 4 as well as linked optical systems such as for example the interior capturing device 13, such as for example a driver monitoring camera, a webcam or coupled appliances with optical sensors, can be provided. The optical sensors, that is the interior capturing device 13 as well as the environmental capturing device 10 of the motor vehicle 1, record preferred points, a picture and/or a video of the environment.

By means of the applied criteria, in particular the image content determination criterion 17, the following exemplary characteristics can be determined: color (color palette, weighting according to occurrence), patterns/structures, contrasts, the environmental temperature (by means of the temperature sensor 12), a color temperature of the ambient light, information based on location (such as for example time, solar altitude, color temperature of the environment, biorhythm of the user) and/or gradients in the image 16 and/or time courses. The image content determination criterion 17 adopts a freely combinable number of recognized features from the at least one selected image 16 based on for example an own selection by the user and/or in automatic manner. By the display system, that is by controlling the lighting device 2, this selection is reproduced in suitable form. Hereto, a corresponding background, corresponding color gradients and/or accent colors can for example be adapted on the mobile terminal 4. In the motor vehicle 1, a background on the display surfaces 34, an accent color in the central touch-sensitive display surface 34 and/or a color and brightness of the illumination in the form of the lighting unit 36 can for example be adapted by controlling the lighting device 2.

Overall, colors, patterns/texture, environmental temperature, temperature, color temperature (based on environment and location), course of a day, human light rhythm and/or biorhythm can be recognized. Based hereon, the adopted features adapt with respect to the appearance and/or the illumination. In addition, not only the lighting device 2 of the motor vehicle 1 can herein be controlled, but also an exterior illumination of the motor vehicle 1. The user can always perform adaptations and specifications, respectively, for example relating to a number of colors, suitable colors (proposals), individual colors, contrasts, pastel/jazzy, without texture, without color, complementary colors etc.

The image content determination criterion 17 can further extrapolate features for a suitable display on larger surface, on which a gradient or pattern is for example continued.

The use of reference data in the form of the selected image 16 for adapting the appearance of the display surface 34 and of the lighting units 36 is central in the motor vehicle 1. The reference data, that is the automatically selected image 16, is present in physical form, in the form of the clothing and items in the motor vehicle 1, and is actively determined, for example by means of the environmental capturing device 10 and/or the location information 22 and/or is present as digital information, for example in the form of the image 16 capable of being provided on the mobile terminal 4 or by the external computing device 6.

The reference data can be: mobile terminal 4 captures a photo at any location, for example in the museum. This is independent of the motor vehicle 1 and of the whereabouts thereof. The user can select a style, that is a certain appearance, via corresponding actuation of a touch-sensitive operating element, voice input or manual input. For example, he can designate an image issue like "Caribbean", whereupon the at least one image 16 can be selected considering data recorded in a database, which is for example stored on the external computing device 6. A recognized or designated location, a season, a daytime can be considered, whereby the appearance is defined. Exemplarily, the location Ischgl in winter at 13 o'clock can be selected for an appearance based on a winter landscape in sunshine.

An interior monitoring in the motor vehicle 1 can be implemented by means of the mobile terminal 4 to for example recognize characteristics of the clothing of the occupant. Here, a green dress, of wool with coarse knitting can for example be recognized and be taken as a basis for the appearance. In addition, the motor vehicle 1 itself can collect reference data, for example during the drive, for example during a holiday travel with the motor vehicle 1 or a drive to a place of employment. By applying the image content determination criterion 17, particularities can be selected from the different reference data, that is finally based on the selected image 16. They are a color palette, occurrence, gradients, structures, patterns, sequences and/or size ratios. The user can get provided options. Herein, typical proposals are made or found characteristics are proposed or automatically selected. In addition, characteristics like readability and/or contrast as well as content- or application-specific, namely if it is a radio menu, a navigation system menu or only a background, can be considered. The age of the occupant, which is for example recorded in the user profile, can for example be considered in the readability.

User-defined contents are displayed based on the determined characteristics, which are adapted. The user can separately define individual parts of the display, that is of the appearance. Here, he can for example separately select a font, symbols and/or a background. The selected indications and thus the generated appearance in the form of the determined image content information 18, on which the appearance is based, can for example be stored in the user profile and optionally communicated via the mobile terminal 4, by means of a vehicle-to-infrastructure communication connection, and to the communication connection 8. This is important for applications such as car sharing and personal branding. The user selects features to be adopted, restricts the number thereof such that he for example causes to adopt only three of the five recognized colors. Therein, features are assigned, for example take a recognized structure as the background, select dominant color as a color accent in a human-machine interface and so on.

Virtually all of the display contents and partial aspects as well as lamps and the color gradient thereof may be freely selectable. Preferably, a bookable option for individualization can be provided. Wherein the determined image content information 18 can be stored on the mobile terminal 4 and/or in its user profile and loaded in another vehicle or for another electrical appliance only in case of booking thereof. The image content information 18 can be recorded in an application. It can be that only the results of this calculation are provided in the motor vehicle 1. In this case, the above-mentioned method steps may at least be partially not performed by the control device 9 of the motor vehicle 1, but by a corresponding control device 9 of the mobile terminal 4 and/or of the external computing device 6.

LIST OF REFERENCE CHARACTERS

1 Motor vehicle
2 lighting device
3 communication interface
4 terminal
5 storage unit
6 computing device
7 user data
8 communication connection
9 control device
10 environmental capturing device
11 position determination device
12 temperature sensor
13 interior capturing device
14 selection criterion
15 image data
16 image
17 image content determination criterion
18 image content information
19 color gradient information
20 structure information
21 landscape
22 location information
23 environmental information
24 position information
environmental temperature information
26 time information
27 driving mode information
28 driving route information
29 state information
30 clothing data
31 clothing evaluation criterion
32 clothing color information
33 material structure information
34 display surface
35 surface
36 lighting unit
S1-S12 method steps

The invention claimed is:

1. A method for controlling a lighting device of a motor vehicle comprising at least one display surface and/or at least one lighting device, the method comprising:
   establishing if a communication connection is established between the motor vehicle and an external computing device on which user data associated with a motor vehicle user is stored;
   applying a selection criterion to image data included by the user data;
   automatically selecting at least one image data capable of being provided by the external computing device based on the selection criteria;
   receiving the automatically selected image data;
   processing the received image data by applying an image content determination criterion to determine image content information comprising a color gradient of the image data;
   controlling the lighting device using the determined image content information to provide a generated image adapted to the color gradient of the at least one selected image data.

2. The method according to claim 1, wherein the image content information comprises structure information indicating a surface structure of an object represented in the at least one image data, and wherein controlling the lighting device comprises providing a pattern reproducing the surface structure on the generated image.

3. The method according to claim 2, wherein the display surface comprises a tactile surface configured to output haptic feedback reproducing the surface structure using the structure information.

4. The method according to claim 2, wherein the control device is configured to process the received image data by applying an image content determination criterion to determine a landscape from the image data and the color gradient and/or the surface structure of the determined landscape.

5. The method according to claim 2, further comprising
   obtaining location information associated with the provided image data; and
   processing the location information when applying the image content determination criterion to determine a color gradient associated with the obtained location information and/or a surface structure associated with the provided location information in the image content information.

6. The method according to claim 5, wherein the determined image content information comprises (i) the color gradient associated with the provided location information and/or (ii) the surface structure associated with the obtained location information only if a landscape is not recognized in the image data upon applying the image content determination criterion.

7. The method according to claim 1, wherein the determined image content information is stored on a user profile on the external computing device.

8. The method according to claim 1, wherein controlling the lighting device comprises processing at least one of the following data prior to providing the generated image:
   environmental data describing an environment of the motor vehicle captured via an environmental capturing device of the motor vehicle,
   position information comprising data describing a position of the motor vehicle, environmental temperature information comprising data describing a temperature of the environment of the motor vehicle, time information comprising data describing a current point of time, driving mode information comprising data describing a driving mode activated in the motor vehicle, driving route information comprising data describing a driving route of the motor vehicle, and state information comprising data describing a state of an occupant of the motor vehicle.

9. The method according to claim 1, wherein, (i) if the communication connection is not established and/or (ii) the image capable of being provided is not selectable, the method further comprises:

capturing clothing data, characterizing a digital representation of clothing of an occupant of the motor vehicle, via an interior capturing device of the motor vehicle;

determining clothing color data, characterizing a digital representation of a clothing color of the clothing, and material structure information, characterizing a digital representation of a material structure of the clothing, by applying a clothing evaluation criterion to the captured clothing data; and controlling the lighting device using the determined clothing color information and the determined material structure information, wherein a pattern reproducing the material structure in the clothing color is displayed by means of the lighting device.

10. A lighting apparatus for a motor vehicle, comprising:
at least one display surface and/or at least one lighting device;

a control device, operatively coupled to the at least one display surface and/or at least one lighting device; and a communication interface, operatively coupled to the control device, for communicating data with an external computing device, wherein the control device is configured to establish if a communication connection is established between the motor vehicle and the external computing device on which user data associated with a motor vehicle user is stored;

apply a selection criterion to image data included by the user data;

automatically select at least one image data capable of being provided by the external computing device based on the selection criteria;

receive the automatically selected image data;

process the received image data by applying an image content determination criterion to determine image content information comprising a color gradient of the image data;

control the lighting device using the determined image content information to provide a generated image adapted to the color gradient of the at least one selected image data.

11. The lighting apparatus according to claim 10, wherein the image content information comprises structure information indicating a surface structure of an object represented in the at least one image data, and wherein the control device is configured to control the lighting device by providing a pattern reproducing the surface structure on the generated image.

12. The lighting apparatus according to claim 11, wherein the display surface comprises a tactile surface configured to output haptic feedback reproducing the surface structure using the structure information.

13. The lighting apparatus according to claim 11, processing the received image data by applying an image content determination criterion to determine a landscape from the image data and the color gradient and/or the surface structure of the determined landscape.

14. The lighting apparatus according to claim 11, wherein the control device is configured to obtain location information associated with the provided image data; and process the location information when applying the image content determination criterion to determine a color gradient associated with the obtained location information and/or a surface structure associated with the provided location information in the image content information.

15. The lighting apparatus according to claim 14, wherein the determined image content information comprises (i) the color gradient associated with the provided location information and/or (ii) the surface structure associated with the obtained location information only if a landscape is not recognized in the image data upon applying the image content determination criterion.

16. The lighting apparatus according to claim 10, wherein the determined image content information is stored on a user profile on the external computing device.

17. The lighting apparatus according to claim 10, wherein the control device is configured to control the lighting device by processing at least one of the following data prior to provide the generated image:

environmental data describing an environment of the motor vehicle captured via an environmental capturing device of the motor vehicle, position information comprising data describing a position of the motor vehicle, environmental temperature information comprising data describing a temperature of the environment of the motor vehicle, time information comprising data describing a current point of time, driving mode information comprising data describing a driving mode activated in the motor vehicle, driving route information comprising data describing a driving route of the motor vehicle, and state information comprising data describing a state of an occupant of the motor vehicle.

18. The lighting apparatus according to claim 10, wherein, (i) if the communication connection is not established and/or (ii) the image capable of being provided is not selectable, the control device is configured to:

capture clothing data, characterizing a digital representation of clothing of an occupant of the motor vehicle, via an interior capturing device of the motor vehicle;

determine clothing color data, characterizing a digital representation of a clothing color of the clothing, and material structure information, characterizing a digital representation of a material structure of the clothing, by applying a clothing evaluation criterion to the captured clothing data; and control the lighting device using the determined clothing color information and the determined material structure information, wherein a pattern reproducing the material structure in the clothing color is displayed by means of the lighting device.

19. The lighting apparatus according to claim 10, wherein the control device is configured to control the lighting device by providing a pattern reproducing the surface structure on the generated image.

20. A lighting apparatus for a motor vehicle, comprising:
at least one display surface and/or at least one lighting device;
a control device, operatively coupled to the at least one display surface and/or at least one lighting device; and
a communication interface, operatively coupled to the control device, for communicating data with an external computing device, wherein the control device is configured to
establish if a communication connection is established between the motor vehicle and the external computing device on which user data associated with a motor vehicle user is stored;
apply a selection criterion to image data included by the user data;
automatically select at least one image data capable of being provided by the external computing device based on the selection criteria;
receive the automatically selected image data;
process the received image data by applying an image content determination criterion to determine image content information comprising a color gradient of the image data, wherein the image content information comprises structure information indicating a surface structure of an object represented in the at least one image data;
control the lighting device using the determined image content information to provide a generated image adapted to the color gradient of the at least one selected image data.

* * * * *